United States Patent [19]

Michel et al.

[11] Patent Number: 4,548,422
[45] Date of Patent: Oct. 22, 1985

[54] BICYCLE FRAME HAVING AN ASSEMBLED-UNIT SHELL STRUCTURE

[75] Inventors: Diaz Michel, Tain l'Hermitage; Loeillet Christian, Ferolles Atilly, both of France

[73] Assignee: Manufacture Industrielle de Cycles et Motocycles - M.I.C.M.O., Machecoul, France

[21] Appl. No.: 442,459

[22] Filed: Nov. 17, 1982

[30] Foreign Application Priority Data

Nov. 17, 1981 [FR] France .................... 81 21447

[51] Int. Cl.⁴ .............................................. B62K 3/02
[52] U.S. Cl. ................... 280/281 R; 180/219
[58] Field of Search ......... 280/281 R, 281 W, 281 B, 280/281 LP, 200; 180/219, 205

[56] References Cited

U.S. PATENT DOCUMENTS

| | | | |
|---|---|---|---|
| 2,378,961 | 6/1945 | Wallace et al. | 280/281 R |
| 2,763,496 | 9/1956 | Roder | 280/281 R |
| 2,792,899 | 5/1957 | Piatti | 280/281 R |

FOREIGN PATENT DOCUMENTS

| | | | |
|---|---|---|---|
| 899010 | 12/1953 | Fed. Rep. of Germany | 280/281 R |
| 974167 | 11/1960 | Fed. Rep. of Germany | 280/281 R |
| 475337 | 5/1915 | France | 280/281 R |
| 612718 | 10/1926 | France | 280/281 R |
| 625354 | 4/1927 | France | 280/281 R |
| 875868 | 10/1942 | France . | |
| 972065 | 1/1951 | France . | |
| 1069997 | 7/1954 | France . | |
| 1127748 | 12/1956 | France | 180/207 |
| 2255206 | 7/1975 | France . | |
| 340909 | 6/1936 | Italy | 280/281 R |
| 283737 | 1/1928 | United Kingdom | 280/281 R |
| 1281731 | 7/1972 | United Kingdom | 280/281 R |

*Primary Examiner*—Joseph F. Peters, Jr.
*Assistant Examiner*—Charles R. Watts
*Attorney, Agent, or Firm*—Oblon, Fisher, Spivak, McClelland & Maier

[57] ABSTRACT

A bicycle frame having a shell structure consisting of two assembled shells wherein each shell has the axis of the passage of the seat shaft combining with the axis of the housing of the crank gear in the plane of assembly, and this same housing is symmetrical in relation to an axis of the shell with a housing located near the seat shaft in order to receive a mudguard part.

5 Claims, 14 Drawing Figures

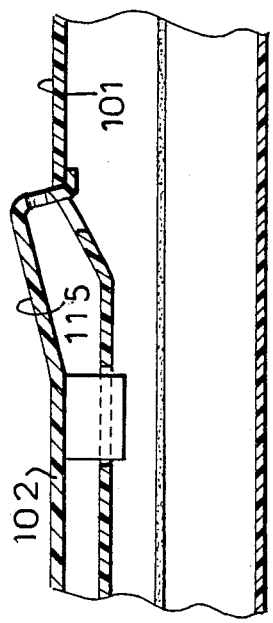
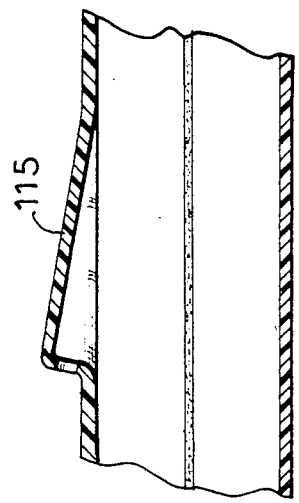
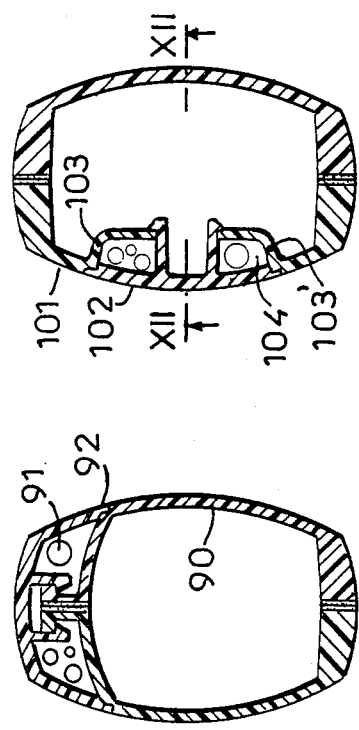
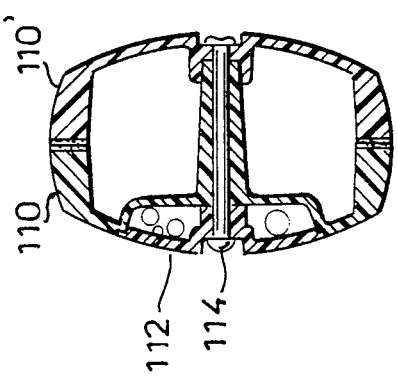

BICYCLE FRAME HAVING AN ASSEMBLED-UNIT SHELL STRUCTURE

FIELD OF THE INVENTION

The present invention relates to a bicycle frame having a shell structure made of a moldable material and more particularly to a plastic bicycle frame.

DESCRIPTION OF THE PRIOR ART

According to known designs, classic bicycle frames are generally made from metal tubes of various sizes and shapes which are connected to one another by means of couplings that fit together. This manufacturing system requires soldering, brazing and welding operations as well as thread-cutting, glazing and other operations which have a considerable effect on the manufacturing cost, considering the major manpower component.

Renewed interest in bicycles has created a demand that exceeds resupply possibilities. The classic technique for manufacturing bicycle frames, in particular by the soldering or brazing of tubes, does not lend itself very well to a rapid increase in the rate of production. Furthermore, the classic frames, generally constructed of steel, are heavy and they must be protected with one or more coats of paint and yet, in spite of this, may be attacked by rust.

SUMMARY OF THE INVENTION

The subject invention makes possible the inexpensive and large-scale production of bicycle frames of a light and resistant rust-proof material. To achieve this, a two-part molding of these frames in plastic is proposed, with the structure having a variable profile. The transverse sections of the various parts of the frame thus meet the concern for best withstanding of foreseeable bending moments as well as presenting a pleasant esthetic appearance.

The shell-structure bicycle frame according to the present invention will be made preferably of a polyester resin reinforced with fiberglass, the use of which is well known in the automobile industry.

The present invention is more particularly applicable to bicycle frames having a shell structure, consisting of two symmetrical shells forming one piece with each other along a longitudinal plane of assembly and bearing attachment and maintenance inserts, in particular for the front fork, the seat shaft, the crank gear and the rear wheel.

According to the invention, the axis of passage of the seat shaft, which combines in a known manner in the assembly plane of the shells with the crank gear housing, is inclined on the axis of symmetry of the shell, and this same crank gear housing is symmetrical in relation to this same axis of symmetry with an analogous housing located near the passage of the seat shaft.

The frame thus formed can be assembled with minimum tools either by gluing or by making use of mechanical attachments (rivets, nut screws, clasps), and it requires only one type of tool to put together the two shells of the same frame.

While the shells may be obtained preferably by hot compression of preimpregnated polyester resins reinforced with fiberglass, they may also be obtained just as well by injection of plastic into a mold, by stamping, or by hot or cold setting of metals.

BRIEF DESCRIPTION OF THE DRAWINGS

Various other characteristics of the present invention will be clear from the following detailed description, when considered in connection with the attached drawing, which shows, by way of nonlimiting example, one embodiment of the frame, and in which:

FIGS. 9 to 11 illustrate possible methods for assembly of the shells in the cross-section plane through the cycle's control casings;

FIG. 12 is a cross-section along the plane XII in FIG. 10; and

FIGS. 13 and 14 are sections of the input or output shapes of the casings shown in FIGS. 9 to 11.

DETAILED DESCRIPTION OF THE PREFERRED EMBODIMENTS

Figure 1:
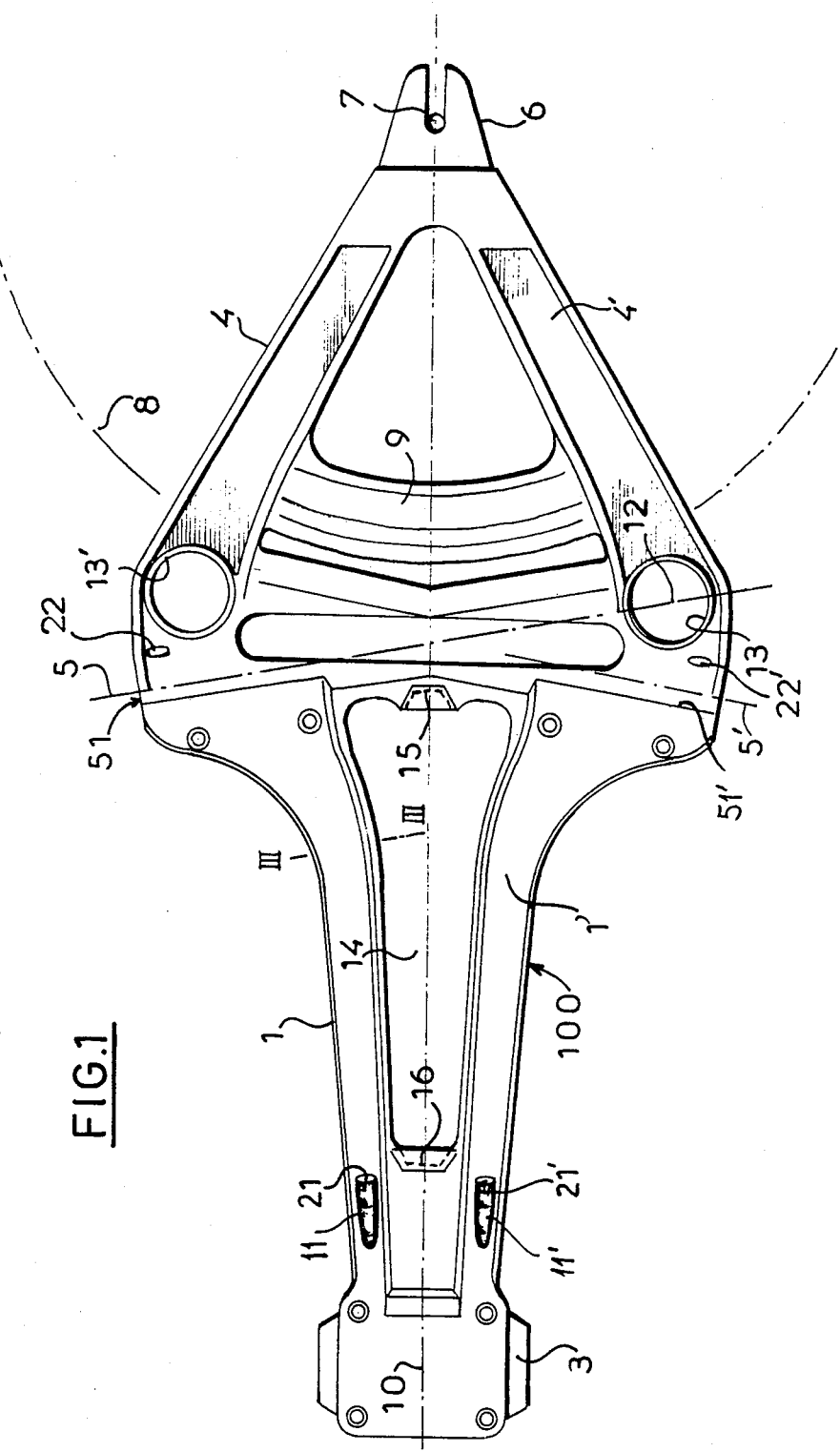
FIG. 1 is a side view of the outer surface of a shell obtained by molding.
Figure 2:
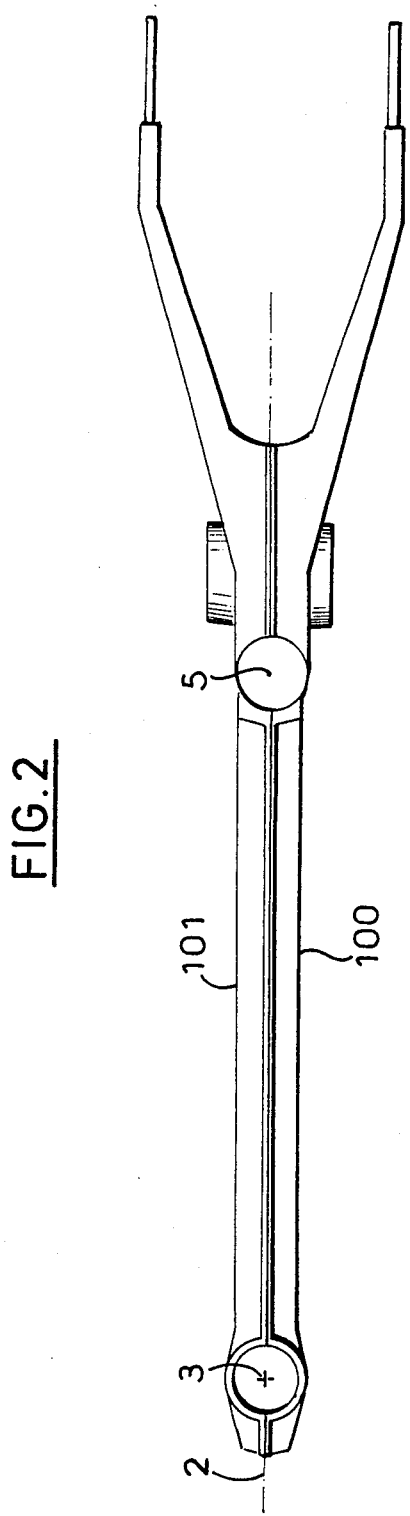
FIG. 2 is a top view of the two assembled shells as shown in FIG. 1.

In FIG. 1, there is shown the outer surface of a shell 100 made by press compression of a polyester resin reinforced with fiberglass placed in a mold. The shell-structure frame shown in FIG. 2 consists of assembly of two shells 100, 101 as shown in FIG. 1.

The frame includes a girder 1 formed by assembly of two appropriate section shapes having the particularity of having a longitudinal plane of assembly 2. The girder 1 extends from the sleeve 3 of the fork head of the front wheel, not shown, to the area of connection with the stay 4 and which bears the axis 5 of the passage 51 of the support insert of the seat shaft.

Arranged symmetrically in relation to the longitudinal axis 10 of the shell, there is a girder 1' which extends from the same sleeve 3 to the area of connection with stay 4' symmetrical with the stay 4 which bears the axis 5' of the passage 51' of the support insert of the seat shaft. The stays 4, 4' are joined to one another in the rear part of the frame which bears an insert 6 equipped with an open bearing 7 for the mounting of the terminal part of a rear-wheel hub axle 8 shown in chain-dotted lines. The stays 4, 4' consist of two I-shaped sections the core of which has a height that increases progressively from the insert 6. The stays 4, 4' are furthermore made so that their cores join together in the passage of the wheel 8 forming a mudguard 9.

The section and shape of the girders 1, 1' are determined by the concern for withstanding the bend moments and various stresses. Each girder 1, 1' also has, individually, an axis of symmetry and, if need be, bears a passageway 11 and 11' for cables such as the brake-control cables, for the gear-change mechanism and for lighting accessories, the inlet for which may be located on the girders 1, 1' or on an element added to the cable path as described below with reference to FIGS. 9 to 11. As specified for the stays 4, 4', the girders 1, 1' also have variable sections from the sleeve 3 to the area of the shell near the axis 5 of the passage 51 of the support for the seat shaft and the axis 12 of the crank gear housing 13.

According to the invention, the axis 5 of the passage 51 of the support insert for the seat shaft, which cooperates in the plane of assembly 2 with the axis 12 of the crank gear housing 13, is inclined on the axis of symmetry 10 of the shell, and this same crank gear housing 13 is symmetrical in relation to the axis 10 of an analogous housing 13' located near the passage 51 of the support for the seat shaft. The aforementioned arrangement is especially interesting in that the frame may be manufactured with a single set of tools (one-cast stamping tools or mold). In addition, the housing 13' will usefully assure the retention and positioning of an inserted part of the mudguard of the rear wheel.

As has been shown in FIG. 1, because of the separation of the girders 1, 1', the plane of assembly of the shells has been split between the axis 5 of the passage 51 of the support for the seat shaft and the axis of the assembly sleeve 3 of the front fork. A longitudinal housing 14 is thus formed in which the opposite ends receive cup-shaped supports 15, 16. The housing 14 may thus receive certain accessories such as an inflation pump held in position between the supports 15, 16.

The means of assembly of the shells consist basically of adhesives, associated, if need be, with mechanical attachments.

Figure 3:
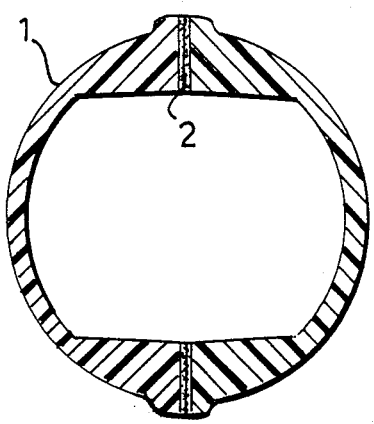
FIGS. 3 to 8 illustrate possible methods for assembly of the shells along the cross-section plane III—III in FIG. 1.

FIG. 3 illustrates one embodiment of a section of the frame, for example at the level of the girders 1 or 1', with no additional centering means. The shells are positioned by the gluing machine and the gluing surface is formed directly in the plane of assembly 2.

Figure 4:
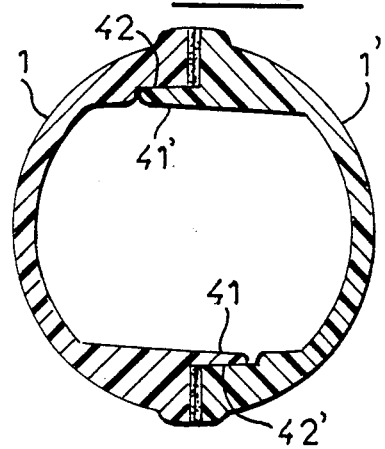

FIG. 4 illustrates a modified version of the section of the frame in which the inner surfaces of the parts of a single shell have localized inequalities of shape. According to the example described, the inner side of the girder part 1 of a shell has complementary inequalities of shape consisting of a centering groove 41 and a support surface 42. The girder part 1' of the other shell has analogous inequalities of shape 41', 42' such that the shapes 41, 42' and 42, 41' can be adjusted and if necessary made solid with one another during assembly of the shells after turning one of them around on its axis of symmetry. Of course, the gluing surface can be larger or smaller, depending on the size of the section to be assembled and the significance of the mechanical stresses it undergoes during use of the bicycle.

Figure 5:
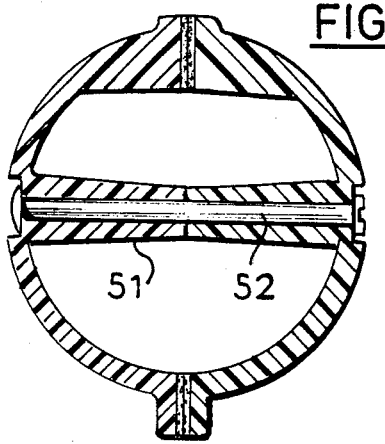

FIG. 5 illustrates a frame section in which the insides of the shells have inequalities of shape consisting of shafts 51 for rivets 52.

Figure 6:
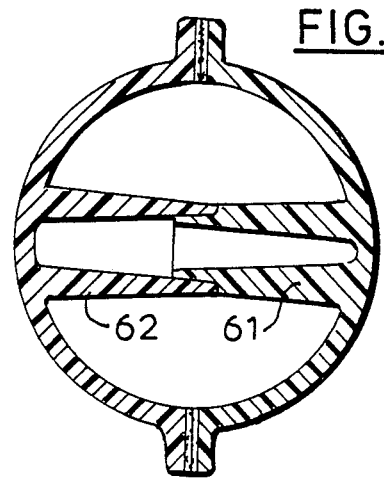

FIG. 6 illustrates a frame section in which the insides of the shells bear tenons 61 and mortices 62.

Figure 7:
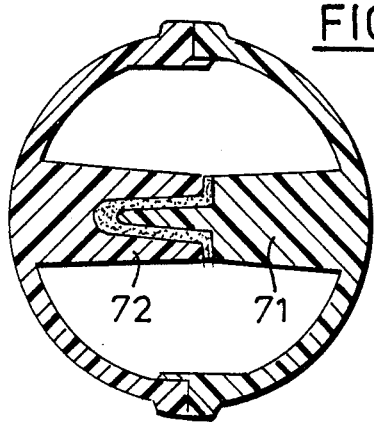

The aforementioned sections illustrated in FIGS. 3 to 6 show gluing surfaces communicating with the outer wall of the shell. According to FIG. 7, gluing is achieved at the junction of the tenon 71 and the mortice 72. Centering of the shells with one another is achieved according to the example already described with reference to FIG. 4. This arrangement requires no fettling of the excess glue.

Figure 8:
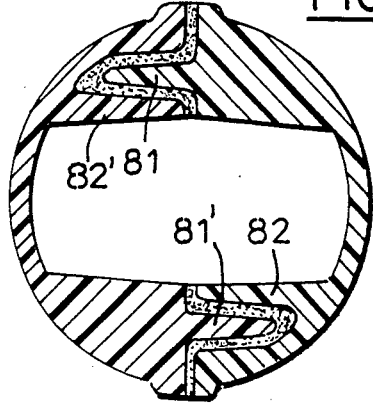

FIG. 8 illustrates an assembly of shells by a set of tenons 81, 81' and mortices 82, 82' with gluing at the junction of the corresponding tenon and mortice.

It should be noted that the shape of the sections of the frame is not restrictive, so long as they can be obtained by molding and their resistance remains satisfactory. In the frame according to the invention, cable passages may be inserted for the brake controls, the gear-change mechanism or the lighting system.

FIG. 9 represents one means for inserting sheaths 91 under a detachable cover 92 on a girder 90 consisting of the assembly of two shells. The cable path may be formed along one face of the girder so as to be turned towards the outside of the girder. The cover 92 is partially integrated into the enveloping surface of the shell part and is held in place by clamping. This cover may usefully constitute a decorative element if it is different in color from the shell. The cover 92 can, as is shown, cap off the assembly line of the two shells forming the frame.

According to FIG. 10, the cover 102 laterally caps off the outer edge of an element 101 of the shell and is housed between the lateral walls 103, 103' of a slot 104 open on the same edge. The cover 102 is here held in place by a clamping means that assures the positive retention of the cover in the bottom of the slot.

According to FIG. 11, which is merely a modification of FIG. 10, the cover 112 is held in place by assembly rivets 114 of the shell elements 110, 110'.

In all of the examples described with reference to FIGS. 9 to 11, the cover may be locally distorted in the shape of a boss 115, as shown in FIGS. 12 and 14, or a slot 116, as shown in FIG. 13. Such configurations facilitate the entry or exit of the cables or their sheaths.

Manufacture of the frame according to the invention is achieved preferably by compression of a reinforced resin in a simple or multiple mold, depending on whether it is desired to obtain one or two identical shells simultaneously.

Assembly of the shells is achieved after turning one of them around on its axis of symmetry 10. For this purpose, in each shell at the desired spot the missing openings are cut or drilled, such as the passage 51 for inserting the seat shaft, or the cable-path entry and exit holes 21, 22. If need be, the remaining bottom of the crank-gear housing 13 is removed. The first shell thus prepared has at least the crank-gear housing 13. The symmetrical housing 13' serves for the attachment and positioning of a rear mudguard element and for the passage of any seat-tube locking device. The second shell has at least the crank-gear housing 13'. The symmetrical housing 13 here serves for the attachment and positioning of the rear mudguard element. The passage 51' for inserting the seat shaft is open, while the passage 51 remains closed. After putting in place the various inserts intended to receive the head of the front fork, the seat shaft and the crank gear, the two shells are assembled by turning one of them around in order to couple them along their longitudinal plane of assembly 2.

Assembly proper of the shells makes use of the methods of gluing, clamping, riveting or ultrasonic welding adapted to the materials utilized in making the shells as has been described with reference to the various figures.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A bicycle frame having a shell structure, said frame comprising two at least generally longitudinally symmetrical shells which are attached to one another along a vertical longitudinal assembly plane, each of said two shells having a horizontal longitudinal plane of symmetry, said frame having an at least generally vertical sleeve adapted to mount a front fork, a first passage adapted to mount a support insert for a seat shaft, and a first housing adapted to mount a crank gear, said sleeve and said first passage being symmetrical about said vertical longitudinal assembly plane and said first housing being perpendicular to said vertical longitudinal assembly plane, said horizontal longitudinal plane of symmetry dividing said shells between said at least generally vertical sleeve and said first passage into two symmetrical girder elements, said first passage having a central axis and said first housing having a central axis which intersects the central axis of said first passage, the central axis of said first passage being forwardly inclined relative to said horizontal longitudinal plane of symmetry such that the upper end of said first passage is forward of the lower end of said first passage, said frame additionally having a second passage which is also symmetrical about said vertical longitudinal assembly plane and which has a central axis which is rearwardly inclined relative to said horizontal longitudinal plane of symmetry such that the lower end of said first passage is forward of the upper end of said first passage, and said frame additionally having a second housing which is also perpendicular to said vertical longitudinal assembly plane, said second housing having a central axis which intersects the central axis of said second passage.

2. A bicycle frame as recited in claim 1 wherein said second housing is adapted to mount a part of a mudguard.

3. A bicycle frame as recited in claim 1 wherein said two shells have localized inequalities of shape along said vertical longitudinal assembly plane to facilitate assembly of said shells.

4. A bicycle frame as recited in claim 3 wherein said localized inequalities of shape are located within said shells.

5. A bicycle frame as recited in claim 1 wherein said shells are molded from plastic.

* * * * *